United States Patent
Lee et al.

(10) Patent No.: US 9,765,663 B2
(45) Date of Patent: Sep. 19, 2017

(54) METHOD OF REGENERATING LEAN NOX TRAP OF EXHAUST PURIFICATION SYSTEM PROVIDED WITH LEAN NOX TRAP AND SELECTIVE CATALYTIC REDUCTION CATALYST AND EXHAUST PURIFICATION SYSTEM

(71) Applicants: HYUNDAI MOTOR COMPANY, Seoul (KR); FEV GMBH, Aachen (DE)

(72) Inventors: Jin Ha Lee, Seoul (KR); Jin Woo Park, Suwon-si (KR); Alexander Vovk, Aachen (DE); Joschka Schaub, Aachen (DE); Thomas Wittka, Aachen (DE)

(73) Assignees: HYUNDAI MOTOR COMPANY, Seoul (KR); FEV GMBH, Aachen (DE)

(\*) Notice: Subject to any disclaimer, the term of this patent is extended or adjusted under 35 U.S.C. 154(b) by 0 days.

(21) Appl. No.: 14/955,948

(22) Filed: Dec. 1, 2015

(65) Prior Publication Data
US 2016/0376963 A1    Dec. 29, 2016

(30) Foreign Application Priority Data
Jun. 25, 2015    (KR) .................... 10-2015-0090768

(51) Int. Cl.
F01N 3/00    (2006.01)
F01N 3/08    (2006.01)
(Continued)

(52) U.S. Cl.
CPC ......... *F01N 3/0885* (2013.01); *F01N 3/0814* (2013.01); *F01N 3/0842* (2013.01);
(Continued)

(58) Field of Classification Search
USPC .................. 60/274, 286, 295, 297, 301, 303
See application file for complete search history.

(56) References Cited

U.S. PATENT DOCUMENTS 6,438,944 B1 * 8/2002 Bidner .................. F01N 3/0842
60/274
7,650,746 B2 * 1/2010 Hu ........................ F01N 13/011
423/239.1
(Continued)

FOREIGN PATENT DOCUMENTS

JP           4541898 B2    7/2010
KR    10-2015-0059535 A    6/2015

*Primary Examiner* — Binh Q Tran
(74) *Attorney, Agent, or Firm* — Brinks Gilson & Lione

(57) ABSTRACT

A method of regenerating a lean NOx trap (LNT) of an exhaust purification system provided with the LNT and a selective catalytic reduction (SCR) catalyst may include: determining whether a regeneration release condition of the LNT is satisfied; determining whether a regeneration demand condition of the LNT is satisfied; and performing regeneration of the LNT if the regeneration release condition of the LNT and the regeneration demand condition of the LNT are satisfied. In particular, the regeneration release condition of the LNT is satisfied if all of an engine operating condition, an LNT state condition, and a lambda sensor synchronization condition are satisfied.

18 Claims, 11 Drawing Sheets

(51) Int. Cl.
*F01N 3/20* (2006.01)
*F01N 11/00* (2006.01)
*F01N 9/00* (2006.01)
*F02D 41/02* (2006.01)
*F02D 41/14* (2006.01)

(52) U.S. Cl.
CPC ............ *F01N 3/2066* (2013.01); *F01N 9/00* (2013.01); *F01N 11/007* (2013.01); *F02D 41/0225* (2013.01); *F02D 41/0275* (2013.01); *F02D 41/1441* (2013.01); *F02D 41/1446* (2013.01); *F02D 41/1454* (2013.01); *F01N 2250/12* (2013.01); *F01N 2550/02* (2013.01); *F01N 2560/025* (2013.01); *F01N 2610/02* (2013.01); *F01N 2900/1614* (2013.01); *F02D 2200/101* (2013.01); *F02D 2200/1002* (2013.01)

(56) References Cited

U.S. PATENT DOCUMENTS

| | | | | |
|---|---|---|---|---|
| 8,555,617 B2* | 10/2013 | Mital | ............... | F01N 3/033 60/295 |
| 8,661,789 B2* | 3/2014 | Sakurai | ............... | F01N 3/0814 60/276 |
| 8,720,191 B2* | 5/2014 | Masuda | ............... | F01N 9/002 60/285 |
| 2014/0158087 A1* | 6/2014 | Silver | ............... | F02B 75/021 123/295 |

* cited by examiner

METHOD OF REGENERATING LEAN NOX TRAP OF EXHAUST PURIFICATION SYSTEM PROVIDED WITH LEAN NOX TRAP AND SELECTIVE CATALYTIC REDUCTION CATALYST AND EXHAUST PURIFICATION SYSTEM

CROSS-REFERENCE TO RELATED APPLICATION

This application claims priority to and the benefit of Korean Patent Application No. 10-2015-0090768, filed on Jun. 25, 2015, the entire contents of which are incorporated herein by reference.

FIELD

The present disclosure relates to a method of regenerating of a lean NOx trap (LNT) of an exhaust purification system provided with the LNT and a selective catalytic reduction (SCR) catalyst and the exhaust purification system.

BACKGROUND

The statements in this section merely provide background information related to the present disclosure and may not constitute prior art.

Generally, exhaust gas flowing out from an engine through an exhaust manifold is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst adsorbs the NOx contained in the exhaust gas when air/fuel ratio is lean, and releases the adsorbed NOx and reduces the released nitrogen oxide and the nitrogen oxide contained in the exhaust gas when the air/fuel ratio is rich atmosphere (hereinafter, it will be called a 'regeneration of the LNT').

Since general diesel engines are operated at the lean air/fuel ratio, however, it is required to artificially adjust air/fuel ratio to be the rich air/fuel ratio in order to release the adsorbed NOx from the LNT. For this purpose, a timing for releasing the NOx adsorbed in the LNT (i.e., regeneration timing). Particularly, the timing where the NOx adsorbed in the LNT can be released should be precisely determined to improve purification efficiency of the NOx and fuel economy and to inhibit degradation of the LNT.

The above information disclosed in this Background section is only for enhancement of understanding of the present disclosure and therefore it may contain information that is not already known to a person of ordinary skill in the art.

SUMMARY

The present disclosure provides a method of regenerating of a lean NOx trap (LNT) of an exhaust purification system provided with the LNT and a selective catalytic reduction (SCR) catalyst and the exhaust purification system having advantages of improving NOx purification efficiency and fuel economy by precisely determining a regeneration timing of the LNT.

A method of regenerating a lean NOx trap (LNT) of an exhaust purification system provided with the LNT and a selective catalytic reduction (SCR) catalyst according to an embodiment of the present disclosure may include: determining whether a regeneration release condition of the LNT is satisfied; determining whether a regeneration demand condition of the LNT is satisfied; and performing regeneration of the LNT if the regeneration release condition of the LNT and the regeneration demand condition of the LNT are satisfied, wherein the regeneration release condition of the LNT is satisfied if all of an engine operating condition, an LNT state condition, and a lambda sensor synchronization condition are satisfied.

The engine operating condition may be satisfied if an engine torque is between a minimum engine torque and a maximum engine torque according to an engine speed, the engine speed is between a minimum engine speed and a maximum engine speed, a gear stage is higher than or equal to a minimum gear stage according to the engine speed and the engine torque, and a torque gradient is smaller than a maximum torque gradient according to the minimum engine torque.

The maximum torque gradient may be calculated by dividing a difference between the minimum engine torque and a current engine torque by a predetermined regeneration period.

The LNT state condition may be satisfied if all of an LNT temperature condition, a minimum time condition between regenerations, and a maximum regeneration period condition are satisfied.

The LNT temperature condition may be satisfied if an upstream temperature of the LNT is higher than a minimum upstream temperature of the LNT according to an average temperature of the LNT, the average temperature of the LNT is higher than a minimum regeneration temperature of the LNT according to a mass flow of an exhaust gas passing through the LNT, and a downstream temperature of the LNT is lower than a maximum regeneration temperature of the LNT.

The maximum regeneration temperature of the LNT may be preset according to an engine operation mode.

The minimum time condition between regenerations may be satisfied if a time passes from previous regeneration is larger than a minimum time between regenerations according to the average temperature of the LNT and a NOx adsorption ratio of the LNT.

The maximum regeneration period condition may be satisfied if a time passes from beginning of regeneration is larger than or equal to a maximum predetermined time.

The maximum predetermined time may be changeable according to the number of consecutive events where lambda sensor synchronization fails.

The lambda sensor synchronization condition may be satisfied if a difference between detected values by first and second oxygen sensors that are mounted respectively at an upstream and a downstream of the LNT is smaller than a predetermined value or ammonia (NH3) is generated at the LNT.

An exhaust purification system according to another embodiment of the present disclosure may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using reductant including carbon or hydrogen contained in the exhaust gas; a dosing module mounted at the exhaust pipe downstream of the LNT and configured to directly inject reducing agent into the exhaust gas; a selective catalytic reduction (SCR) catalyst mounted at the exhaust pipe downstream of the dosing module and configured to reduce the NOx contained in the exhaust gas by using the reducing agent injected by the dosing module; and a controller configured to perform denitrification (DeNOx) by using the LNT and/or the SCR catalyst according to a driving condition of the engine, wherein the controller performs regeneration of the LNT if both of a regeneration demand condition of the LNT and a regeneration release condition of the LNT are satisfied, and wherein the regeneration release condition of the LNT is satisfied if all of an engine operating condition, an LNT state condition, and a lambda sensor synchronization condition are satisfied.

The engine operating condition may be satisfied if an engine torque is between a minimum engine torque and a maximum engine torque according to an engine speed, the engine speed is between a minimum engine speed and a maximum engine speed, a gear stage is higher than or equal to a minimum gear stage according to the engine speed and the engine torque, and a torque gradient is smaller than a maximum torque gradient according to the minimum engine torque.

The controller may calculate the maximum torque gradient by dividing a difference between the minimum engine torque and a current engine torque by a predetermined regeneration period.

The LNT state condition may be satisfied if all of an LNT temperature condition, a minimum time condition between regenerations, and a maximum regeneration period condition are satisfied.

The LNT temperature condition may be satisfied if an upstream temperature of the LNT is higher than a minimum upstream temperature of the LNT according to an average upstream temperature of the LNT, the average temperature of the LNT is higher than a minimum regeneration temperature of the LNT according to a mass flow of an exhaust gas passing through the LNT, and a downstream temperature of the LNT is lower than a maximum regeneration temperature of the LNT.

The maximum regeneration temperature of the LNT may be preset according to an engine operation mode.

The minimum time condition between regenerations may be satisfied if a time passes from previous regeneration is larger than a minimum time between regenerations according to the average temperature of the LNT and a NOx adsorption ratio of the LNT.

The maximum regeneration period condition may be satisfied if a time passes from beginning of regeneration is larger than or equal to a maximum predetermined time.

The maximum predetermined time may be changeable according to the number of consecutive events where lambda sensor synchronization fails.

The lambda sensor synchronization condition may be satisfied if a difference between detected values by first and second oxygen sensors that are mounted respectively at an upstream and a downstream of the LNT is smaller than a predetermined value or ammonia (NH3) is generated at the LNT.

As described above, purification efficiency of the NOx may be improved and degradation of the LNT may be inhibited by precisely determining the regeneration timing of the LNT.

In addition, fuel economy may be improved by inhibiting unnecessary regeneration of the LNT.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
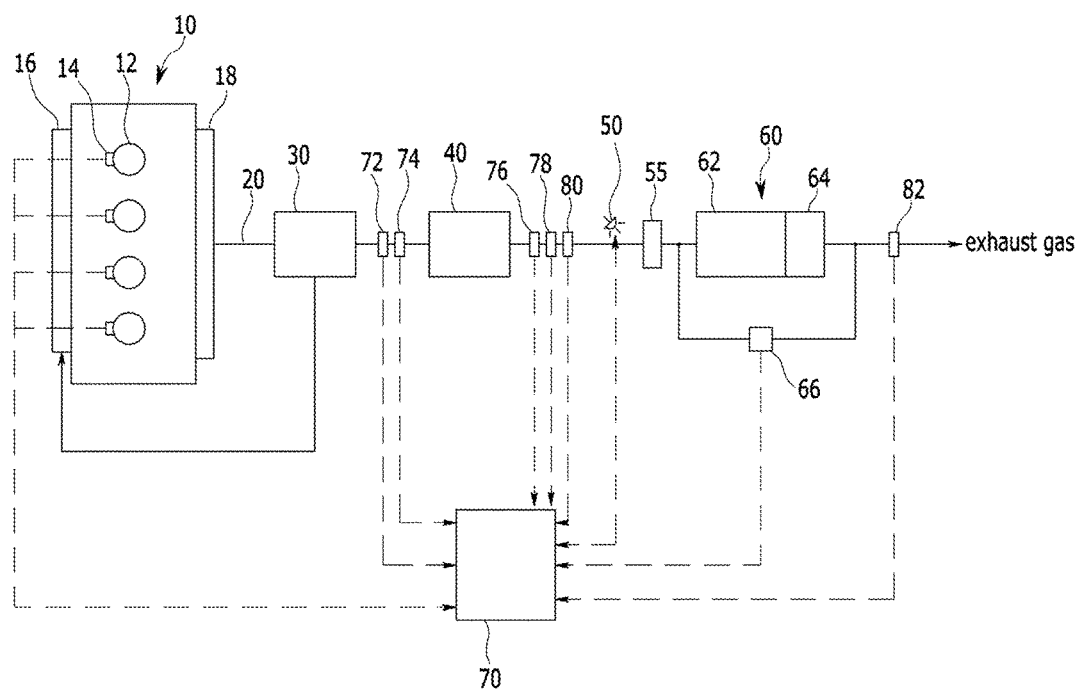
FIG. 1 is a schematic diagram of an exhaust purification system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a schematic diagram of an exhaust purification system according to an embodiment of the present disclosure.

As shown in FIG. 1, an exhaust system for an internal combustion engine includes an engine 10, an exhaust pipe 20, an exhaust gas recirculation (EGR) apparatus 30, a lean NOx trap (LNT) 40, a dosing module 50, a particulate filter 60, and a controller 70. In addition, a turbo charger (not shown) may be mounted at the exhaust pipe 20. The turbo charger increases an intake air amount by using energy of an exhaust gas.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that the exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbon, carbon monoxide, particulate matter, and nitrogen oxide (NOx) contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor (or a first lambda sensor) 72 is mounted on the exhaust pipe 20 downstream of the exhaust gas recirculation apparatus 30. The first oxygen sensor 72 detects oxygen amount in the exhaust gas passing through the exhaust gas recirculation apparatus 30 and transmits a signal corresponding thereto to the controller 70 so as to help lean/rich control of the exhaust gas performed by the controller 70. In this specification, the detected value by the first oxygen sensor 72 is called a lambda at an upstream of the LNT.

In addition, a first temperature sensor 74 is mounted on the exhaust pipe 20 downstream of the exhaust gas recirculation apparatus 30 and detects temperature of the exhaust gas passing through the exhaust gas recirculation apparatus 30.

The LNT 40 is mounted on the exhaust pipe 20 downstream of the exhaust gas recirculation apparatus 30. The LNT 40 adsorbs the nitrogen oxide (NOx) contained in the exhaust gas at a lean air/fuel ratio, and releases the adsorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbon (HC) contained in the exhaust gas.

Herein, the hydrocarbon represents all compounds consisting of carbon and hydrogen contained in the exhaust gas and the fuel.

A second oxygen sensor 76, a second temperature sensor 78, and a first NOx sensor 80 are mounted on the exhaust pipe 20 downstream of the LNT 40.

The second oxygen sensor (or a second lambda sensor) 76 detects oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called a lambda at a downstream of the LNT.

The second temperature sensor 78 detects temperature of the exhaust gas flowing into the particulate filter 60 and transmits a signal corresponding thereto to the controller 70.

The first NOx sensor 80 detects NOx concentration contained in the exhaust gas flowing into the particulate filter 60 and transmits a signal corresponding thereto to the controller 70. The NOx concentration detected by the first NOx sensor 80 may be used to determine amount of reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia.

A mixer 55 is mounted on the exhaust pipe 20 downstream of the dosing module 50 and mixes the reducing agent and the exhaust gas evenly.

The particulate filter 60 is mounted on the exhaust pipe downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction (SCR) catalyst 64, but is not limited thereto.

It is to be understood that an SCR catalyst in this specification and claims, unless otherwise described, includes the SCR catalyst itself or the SDPF.

The SDPF 62 is formed by coating the SCR on walls defining channels of the DPF. Generally, the DPF includes a plurality of inlet channels and outlet channels. Each of the inlet channels includes an end that is open and the other end that is blocked, and receives the exhaust gas from a front end of the DPF. In addition, each of the outlet channels includes an end that is blocked and the other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR catalyst 64 is mounted at the rear of the SDPF 62. The additional SCR catalyst 64 further reduces the nitrogen oxide which is not purified by the SDPF 62. The additional SCR catalyst 64 may be mounted physically apart from the SDPF 62.

Meanwhile, a pressure difference sensor 66 is mounted on the exhaust pipe 20. The pressure difference sensor 66 detects pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than predetermined pressure. In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects concentration of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate performance of the particulate filter 60.

The controller 70 determines a driving condition of the engine based on the signals transmitted from each sensor, and performs the leans/rich control and controls the amount of the reducing agent injected by the dosing module 50 based on the driving condition of the engine. For example, the controller 70 may release the NOx from the LNT 40 by controlling the air/fuel ratio to be rich atmosphere and may reduce the released NOx by using reductant contained in the exhaust gas (in this specification, it will be called the 'regeneration of the LNT'). In addition, the controller 70 may remove the NOx at the SDPF 60 by injecting reducing agent. The lean/rich control may be performed by controlling fuel amount injected by the injector 14.

The controller 70 is provided with a plurality of maps, characteristics of the LNT, and correction coefficients, and may determine regeneration start timing and regeneration end timing based thereon. The plurality of maps, characteristics of the LNT, and correction coefficients may be set through a number of experiments.

In addition, the controller 70 controls regeneration of the particulate filter 60 and desulfurization of the LNT 40.

For these purposes, the controller 70 may include one or more processors activated by a predetermined program, and the predetermined program can be programmed to perform each step of a method of regenerating the LNT.

Figure 2:
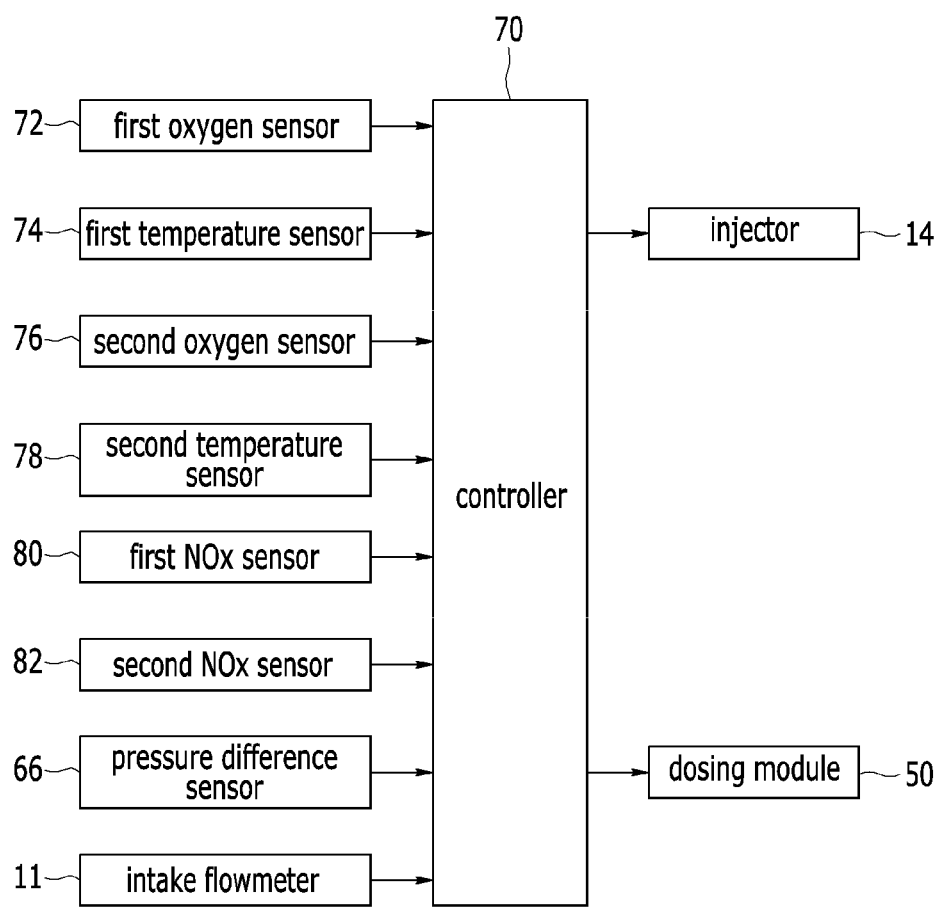
FIG. 2 is a block diagram illustrating relationship of an input and output of a controller used in a method of regenerating an LNT of an exhaust purification system.

FIG. 2 is a block diagram illustrating relationship of an input and output of a controller used in a method of regenerating an LNT of an exhaust purification system.

As shown in FIG. 2, the first oxygen sensor 72, the first temperature sensor 74, the second oxygen sensor 76, the second temperature sensor 78, the first NOx sensor 80, the second NOx sensor 82, the pressure difference sensor 66 and an intake flowmeter 11 are electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as an upstream lambda. The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 detects the temperature of the exhaust gas passing through the exhaust gas recirculation apparatus 30 and transmits the signal corresponding thereto to the controller 70.

The second oxygen sensor 76 detects the oxygen amount in the exhaust gas flowing into the particulate filter 60 and transmits the signal corresponding thereto to the controller 70. The detected value by the second oxygen sensor 76 may be represented as a downstream lambda.

The second temperature sensor 78 detects the temperature of the exhaust gas flowing into the particulate filter 60 and transmits the signal corresponding thereto to the controller 70.

The first NOx sensor 80 detects the NOx concentration contained in the exhaust gas flowing into the particulate filter 60 and transmits the signal corresponding thereto to the controller 70.

The second NOx sensor 82 detects the NOx concentration contained in the exhaust gas exhausted from the particulate filter 60 and transmits the signal corresponding thereto to the controller 70.

The pressure difference sensor 66 detects the pressure difference between a front end portion and a rear end portion of the particulate filter 60 and transmits the signal corresponding thereto to the controller 70.

The intake flowmeter 11 detects an intake air flow supplied to an intake system of the engine 10 and transmits the signal corresponding thereto to the controller 70.

The controller 70 determines the driving condition of the engine, fuel injection amount, fuel injection timing, fuel injection pattern, injection amount of the reducing agent, regeneration timing of the particulate filter 60, and desulfurization/regeneration timing of the LNT 40 based on the transmitted value, and outputs a signal for controlling the injector 14 and the dosing module 50 to the injector 14 and the dosing module 50. In addition, the controller 70 may determine the regeneration start timing and the regeneration end timing of the LNT 40 based on the transmitted values.

Meanwhile, a plurality of sensors other than the sensors illustrated in FIG. 2 may be mounted in the exhaust purification device. For better comprehension and ease of description, however, description of the plurality of sensors will be omitted.

FIG. 3 to FIG. 11 are flowcharts of a method of regenerating the LNT according to an embodiment of the present disclosure.

Figure 3:
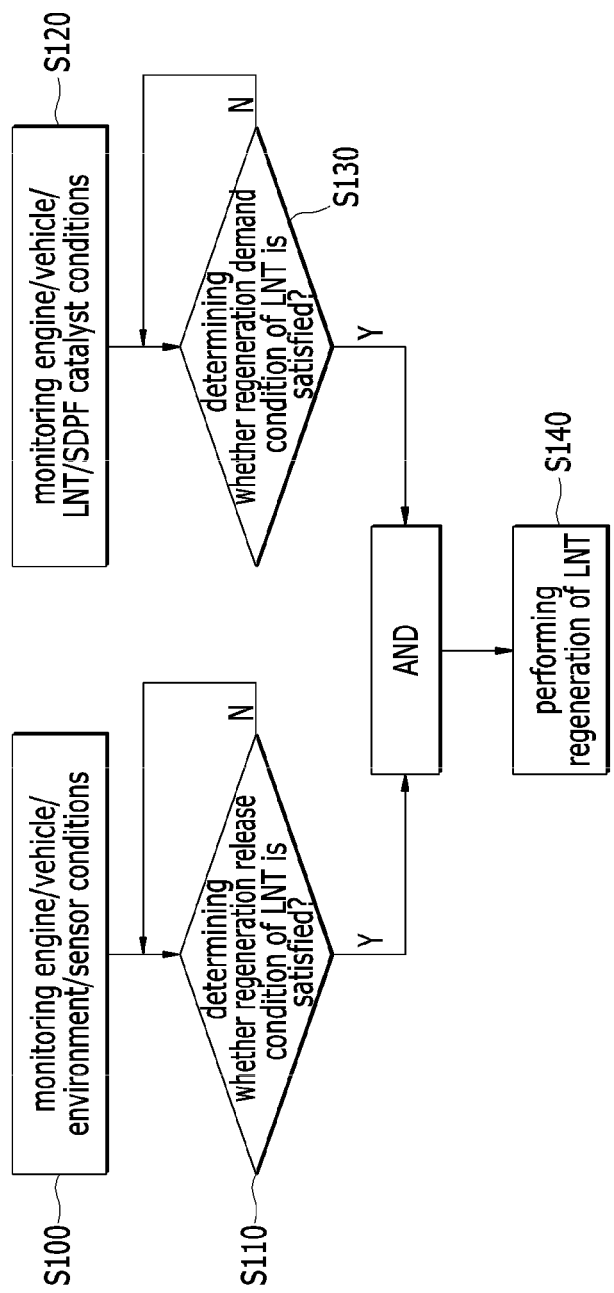
FIG. 3 is a flowchart of a method of regenerating an LNT.

As shown in FIG. 3, the controller 70 and various sensors monitor engine/vehicle/environment/sensor conditions at step S100, and the controller 70 determines whether the engine/vehicle/environment/sensor conditions satisfy a regeneration release condition of the LNT at step S110 in the method of regenerating the LNT according to the embodiment of the present disclosure. In addition, the controller 70 and various sensors monitor engine/vehicle/LNT/SCR catalyst at step S120, and the controller 70 determines whether states of the engine/vehicle/LNT/SCR catalyst satisfy a regeneration demand condition of the LNT at step S130. After that, the controller 70 performs the regeneration of the LNT 40 at step S140 if both of the regeneration release condition of the LNT and the regeneration demand condition of the LNT are satisfied. If neither of the regeneration release condition of the LNT and the regeneration demand condition of the LNT is satisfied, the controller 70 does not perform the regeneration of the LNT 40 and continuously checks whether non-satisfied condition is satisfied.

Figure 4:
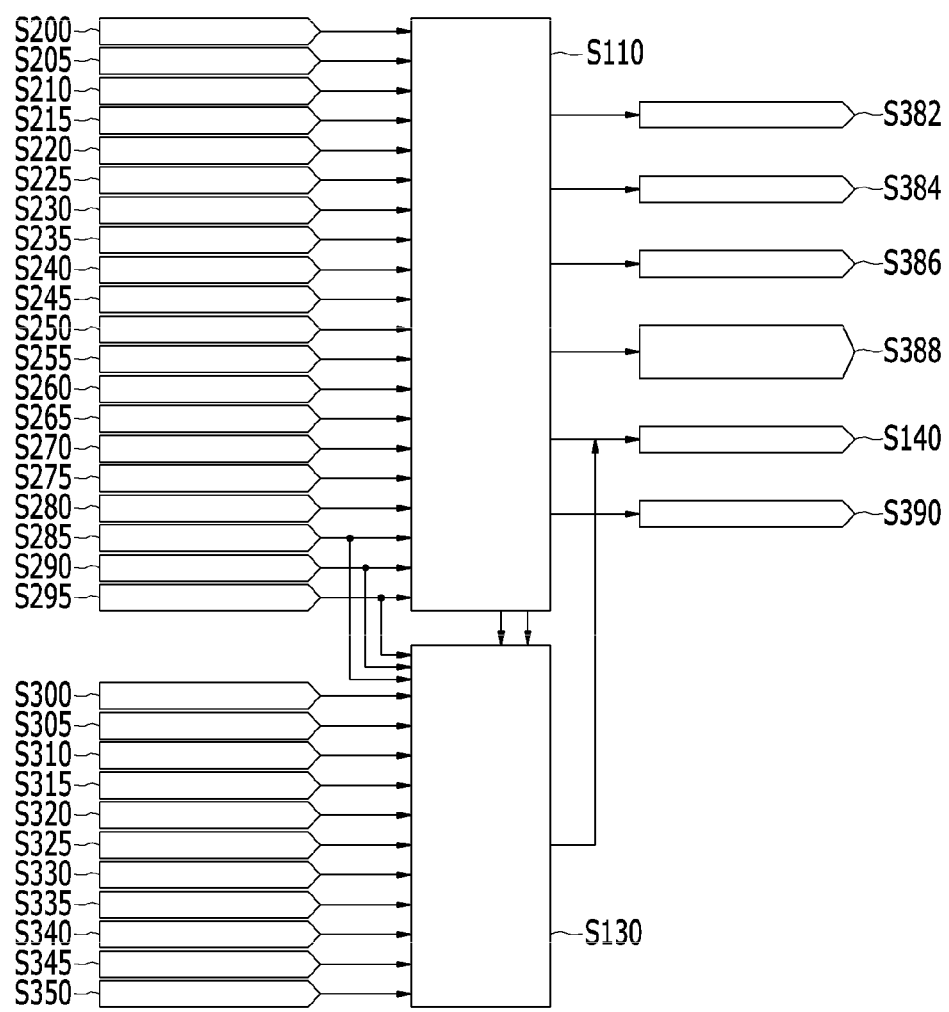
FIG. 4 illustrates a flowchart in FIG. 3 in further detail.

Referring to FIG. 4, the method of regenerating the LNT will be described in further detail.

As shown in FIG. 4, the method of regenerating the LNT begins with detecting or calculating various data. That is, the controller 70 detects or calculates a mass flow of the exhaust gas passing through the LNT 40 at step S200, detects or calculates a NOx concentration at the upstream of the LNT 40 at step S205, detects or calculates a NOx concentration at the downstream of the LNT 40 at step S210, detects or calculates a temperature at an upstream of the turbo charger (hereinafter, it will be called an 'upstream turbo temperature') at step S215, detects or calculates a fuel temperature at step S220, and detects or calculates an engine torque at step S225. Herein, a mass flow means a mass per unit time. The mass is calculated by integrating the mass flow over a time. In addition, that the controller 70 detects data includes a sensor electrically connected to the controller 70 detects the data.

The mass flow of the exhaust gas passing through the LNT 40 may be calculated from the intake air flow detected by the intake flowmeter 11 and an EGR amount or may be detected by an additional sensor, the NOx concentration at the upstream of the LNT 40 may be calculated from a NOx mass generated according to the driving condition of the engine and a mass of the exhaust gas or may be detected by an additional sensor, and the NOx concentration at the downstream of the LNT 40 may be calculated from a NOx concentration at the upstream of the LNT 40 and a state of the LNT 40 or may be detected by the first NOx sensor 80. The temperature at the upstream of the turbo charger may be calculated from the driving condition of the engine or from the temperature of the exhaust gas detected by the first temperature sensor 74, the fuel temperature may be detected by a temperature sensor mounted in a fuel tank or on a fuel supply line, and the engine torque may be calculated from the driving condition of the engine.

In addition, the controller 70 detects a battery voltage at step S230, detects a coolant temperature at step S235, detects a state of the first oxygen sensor 72 and a state of the second oxygen sensor 76 at steps S240 and S245, detects an engine speed at step S250, and detects a currently engaged gear stage at step S255. Herein, a state of a sensor indicates the sensor is activated. If the sensor is activated, the state of the sensor may be a value of "True" or "1". However, if the sensor is not activated, the state of the sensor may be a value of "False" or "0".

In addition, the controller 70 detects or calculates the upstream lambda and the downstream lambda at steps S260 and S265, detects or calculates the temperature of the exhaust gas at the upstream of the LNT 40 and the temperature of the exhaust gas at the downstream of the LNT 40 at steps S270 and S275, calculates a NOx adsorption ratio of the LNT 40 at step S280, detects an engine operation mode at step S285, calculates a NOx mass adsorbed in the LNT 40 (NOx adsorption in the LNT 40) at step S290, and calculates an average temperature of the LNT 40 at step S295. That is, the upstream lambda and the downstream lambda may be detected by the first oxygen sensor 72 and the second oxygen sensor 76 or may be calculated based on a driving condition of the engine and the state of the LNT 40 by the controller 70. The temperature of the exhaust gas at the upstream of the LNT 40 and the temperature of the exhaust gas at the downstream of the LNT 40 may be detected by the first and second temperature sensors 74 and 78 or may calculated based on the driving condition of the engine by the controller 70. The NOx adsorption ratio of the LNT 40 may be calculated from a maximum NOx adsorption in the LNT 40 (maximum NOx mass adsorbed in the LNT 40) and an actual NOx adsorption in the LNT 40 (actual NOx mass adsorbed in the LNT 40) calculated based on the driving condition of the engine and the state of the LNT 40 by the controller 70, and the average temperature of the LNT 40 may be calculated from the temperature of the exhaust gas at the upstream of the LNT 40 and the temperature of the exhaust gas at the downstream of the LNT 40 by the controller 70.

Meanwhile, the engine operation mode includes a normal mode, an LNT regeneration mode, an LNT desulfurization mode, an SDPF regeneration mode, an SDPF desulfurization mode, and so on. The normal mode is a mode that is not the LNT regeneration mode, the LNT desulfurization mode, the SDPF regeneration mode, and the SDPF desulfurization mode.

In addition, the controller 70 detects a vehicle speed at step S300, calculates an aging factor of the LNT 40 at step S305, detects a travel distance of the vehicle at step S310, detects a mass flow of air supplied to the engine 10 when regeneration (i.e., at rich air/fuel ratio) at step S315, calculates a target lambda when regeneration at step S320, and calculates an O2 mass adsorbed in the LNT 40 (O2 adsorption in the LNT 40) at step S325. Herein, the aging factor of the LNT 40 may be calculated according to a use period of the LNT 40, the mass flow of the air supplied to the engine 10 when regeneration may be detected by the intake flowmeter 11 when regeneration, the target lambda when regeneration may be determined according to the driving condition of the engine, the state of the LNT 40 and a state of the SDPF 60, and the O2 mass adsorbed in the LNT 40 may be calculated based on the temperature of the LNT 40, operating history of the engine after previous regeneration of the LNT 40, the aging factor of the LNT 40, and so on.

In addition, the controller 70 calculates a target NH3 adsorption in the SDPF 60 (target NH3 mass adsorbed in the SDPF 60) at step S330, calculates a NOx mass flow at the downstream of the SDPF 60 at step S335, detects a state of the second NOx sensor 82 at step S340, calculates a NH3 adsorption in the SDPF 60 (NH3 mass adsorbed in the SDPF 60) at step S345, and calculates a NOx purification efficiency of the SDPF 60 at step S350. Herein, the target NH3 adsorption in the SDPF 60 may be calculated from a predetermined map based on the temperature of the SDPF 60, a lambda at the upstream of the SDPF, the NOx purification efficiency of the SDPF 60, and so on. The NOx mass flow at the downstream of the SDPF 60 may be calculated based on the NOx concentration at the downstream of the SDPF 60 detected by the second NOx sensor 82, the NH3 adsorption in the SDPF 60 may be calculated based on the temperature of the SDPF 60, the lambda at the upstream of the SDPF, and injection history of the reducing agent by the dosing module 50, and the NOx purification efficiency of the SDPF 60 may be calculated based on the temperature of the SDPF 60, the lambda at the upstream of the SDPF, and the NH3 adsorption in the SDPF 60.

If various data is detected or calculated, the controller 70 determines whether the regeneration release condition of the LNT is satisfied at the step S110 based on the mass flow of the exhaust gas passing through the LNT 40, the NOx concentration at the upstream of the LNT 40, the NOx concentration at the downstream of the LNT 40, the temperature at the upstream of the turbo charger, the fuel temperature, the engine torque, the battery voltage, the coolant temperature, the state of the first oxygen sensor 72, the state of the second oxygen sensor 76, the engine speed, the gear stage, the upstream lambda, the downstream lambda, the temperature of the exhaust gas at the upstream of the LNT 40, the temperature of the exhaust gas at the downstream of the LNT 40, the NOx adsorption ratio of the LNT 40, the NOx adsorption in the LNT 40, and the average temperature of the LNT 40. At this process, the controller 70 detects a temperature state at the upstream of the turbo charger at step S382, detects a gear stage state at step S384, detects a general NOx release condition state at step S386, outputs a reset signal of NOx and O2 adsorption due to lambda sensor synchronization at step S388, detecting whether the lambda sensor synchronization occurs at step S390, and detecting whether a lambda sensor synchronization demand switch is turned on. The temperature state at the upstream of the turbo charger represents whether the temperature at the upstream of the turbo charger is within a predetermined range. That is, if the temperature at the upstream of the turbo charger is within the predetermined range, the temperature state at the upstream of the turbo charger may be a value of "True" or "1". On the contrary, if the temperature at the upstream of the turbo charger is not within the predetermined range, the temperature state at the upstream of the turbo charger may be a value of "False" or "0". Similarly, the gear stage state represents whether the gear stage is within a predetermined gear stage range, the general NOx release condition state represents whether current engine/environment/LNT conditions satisfy general conditions where the NOx can be released, and whether the lambda sensor synchronization occurs represents whether a difference between the lambda values detected respectively by the first and second oxygen sensors 72 and 76 is smaller than or equal to a predetermined value. In addition, if the reset signal of NOx and O2 adsorption is outputs, the controller 70 resets the NOx adsorption in the LNT 40 and the O2 adsorption in the LNT 40 (O2 mass adsorbed in the LNT 40) stored in a memory to 0 or a predetermined value. Furthermore, if the lambda sensor synchronization demand switch is turned on, the controller 70 performs various controls for synchronizing the lambda sensors.

In addition, the controller 70 determines whether the regeneration demand condition of the LNT is satisfied at the step S130 based on whether the lambda sensor synchronization occurs, whether the lambda sensor synchronization demand switch is turned on, the engine operation mode, the NOx adsorption in the LNT 40, the average temperature of the LNT 40, the vehicle speed, the aging factor of the LNT 40, the travel distance of the vehicle, the mass flow of the air supplied to the engine 10 when regeneration (i.e., at rich air/fuel ratio), the target lambda when regeneration, the O2 adsorption in the LNT 40, the target NH3 adsorption in the SDPF 60, the NOx mass flow at the downstream of the SDPF 60, the state of the second NOx sensor 82, the NH3 adsorption in the SDPF 60, the NOx purification efficiency of the SDPF 60, and so on.

After that, if the regeneration release condition of the LNT and the regeneration demand condition of the LNT are satisfied, the controller 70 outputs a regeneration signal and performs the regeneration of the LNT 40 at step 140.

Hereinafter, referring to FIG. 5, the step S110 in FIG. 4 will be described in detail.

Figure 5:
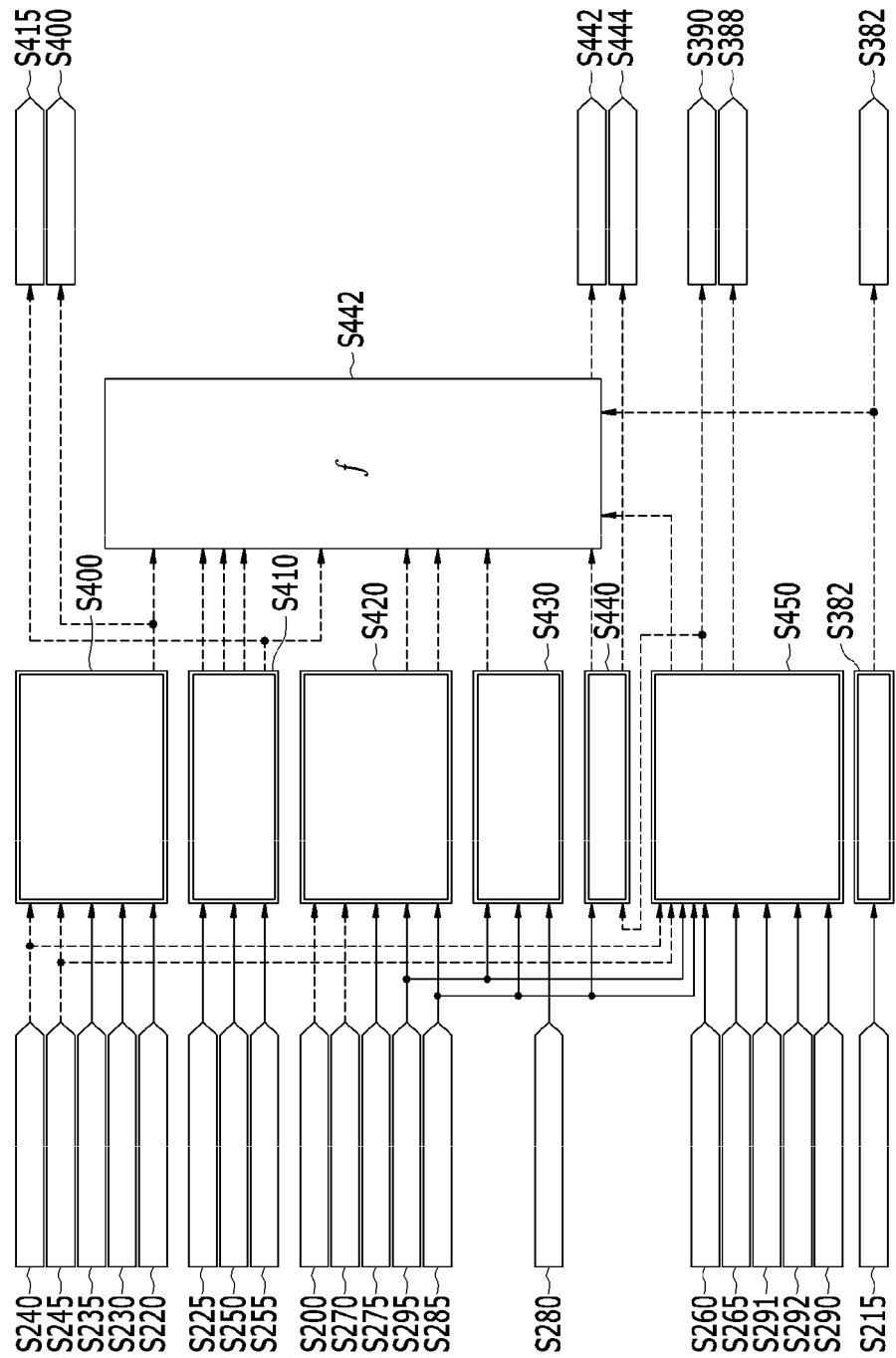
FIG. 5 illustrates step S110 in FIG. 4 in further detail.

Referring to FIG. 5, the step S110 includes determining whether the general regeneration release condition is satisfied at step S400, determining whether an engine operating condition is satisfied at step S410, determining whether an LNT state condition is satisfied at steps S420, S430, and S440, determining whether the lambda sensor synchronization condition is satisfied at step S450, and determining whether the temperature state at an upstream of the turbo charger is satisfied at the step S382. The controller 70 outputs a regeneration release signal of the LNT 40 at step S442 if all the general regeneration release condition, the engine operating condition, the LNT state condition, the lambda sensor synchronization condition, and the temperature at an upstream of the turbo charger condition are satisfied.

In further detail, the controller 70 determines that the general regeneration release condition is satisfied at step S400 based on the state of the first oxygen sensor 72, the state of the second oxygen sensor 76, the coolant temperature, the battery voltage, and the fuel temperature, and outputs a corresponding signal if the general regeneration release condition is satisfied. The general regeneration release condition includes whether the first and second oxygen sensors 72 and 76 are activated, whether the fuel temperature is within a predetermined temperature range, whether the battery voltage is within a predetermined voltage range, and whether the coolant temperature is within a predetermined coolant temperature range.

The controller 70 determines whether the engine operating condition is satisfied at step S410 based on the engine torque, the engine speed, and the gear stage, and outputs a corresponding signal if the engine operating condition is satisfied. The engine operating condition includes an engine torque condition, an engine speed condition, a gear stage condition, and a torque gradient condition. If the engine operating condition is satisfied, the controller 70 outputs a satisfaction signal of the torque gradient condition, a satisfaction signal of the engine speed condition, a satisfaction signal of the engine torque condition, and a satisfaction signal of the gear stage condition at step S411, S412, S413, and S415.

The controller 70 determines whether an LNT temperature condition is satisfied at step S420 based on the mass flow of the exhaust gas passing through the LNT 40, the temperature of the exhaust gas at the upstream of the LNT 40, the temperature of the exhaust gas at the downstream of the LNT 40, the average temperature of the LNT 40, and the engine operation mode, and outputs a corresponding signal if the LNT temperature condition is satisfied.

The controller 70 determines whether a minimum time condition between regenerations is satisfied at step S430 based on the average temperature of the LNT 40, the engine operation mode, and the NOx adsorption ratio of the LNT 40, and outputs a corresponding signal if the minimum time condition between regenerations is satisfied.

The controller 70 determines whether a maximum regeneration period condition is satisfied at step S440 based on the engine operating condition and whether the lambda sensor synchronization occurs, and outputs a corresponding signal if the maximum regeneration period condition is satisfied. At this time, the controller 70 outputs a signal which indicates the lambda sensor synchronization demand switch is turned on at step S444.

The controller 70 determines whether the lambda sensor synchronization condition is satisfied at step S450 based on the state of the first oxygen sensor 72, the state of the second oxygen sensor 76, the average temperature of the LNT 40, the engine operation mode, the upstream lambda, the downstream lambda, the NOx concentration at the upstream of the LNT 40, the NOx concentration at the downstream of the LNT 40, and the NOx adsorption in the LNT 40, and outputs a lambda sensor synchronization signal and the reset signal of NOx and O2 adsorption due to the lambda sensor synchronization at steps S390 and S388 if the lambda sensor synchronization condition is satisfied. Herein, the NOx concentration at the upstream of the LNT 40 may be calculated from NOx mass generated according to the driving condition of the engine and mass of the exhaust gas or may be detected by an additional sensor at step S291, and the NOx concentration at the downstream of the LNT 40 may be calculated from the NOx concentration at the upstream of the LNT 40 and the state of the LNT 40 or may be detected by the first NOx sensor 80 at step S292.

The controller 70 determines whether the temperature state at the upstream of the turbo charger condition is satisfied based on the temperature at the upstream of the turbo charger and outputs the temperature state at the upstream of the turbo charger at step S382.

Hereinafter, referring to FIG. 6, the step S410 in FIG. 5 will be described in detail.

Figure 6:
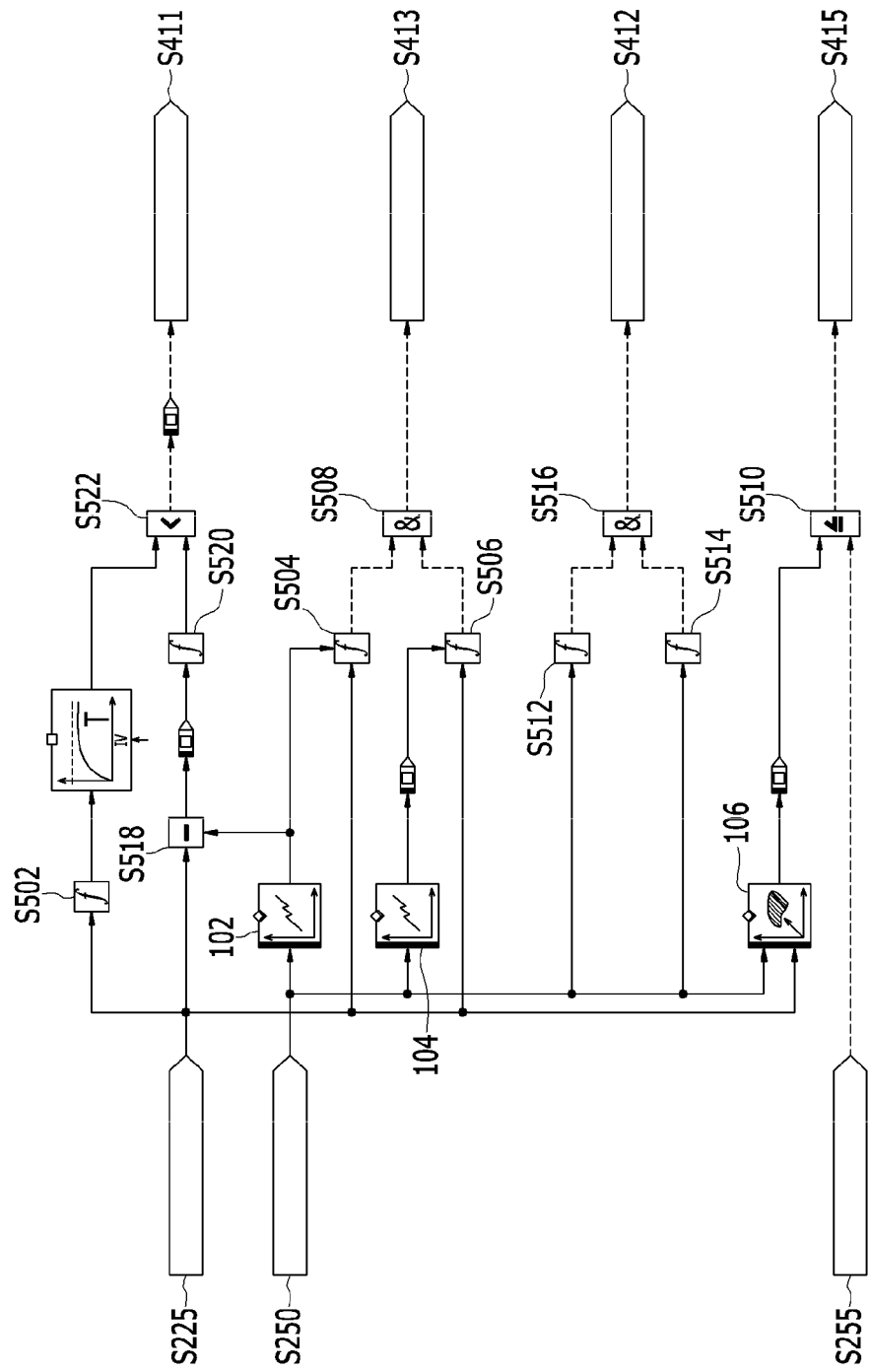
FIG. 6 illustrates step S410 in FIG. 5 in further detail.

As shown in FIG. 6, the controller 70 calculates a minimum engine torque and a maximum engine torque at the current driving condition of the engine by inputting the engine speed into predetermined maps 102 and 104, determines whether a current engine torque is larger than or equal to the minimum engine torque at step S504, and determines whether the current engine torque is smaller than or equal to the maximum engine torque at step S506. After that, the controller 70 determines whether the step S504 and the step S506 are satisfied at step S508, and the satisfaction signal of the engine torque condition is output at step S413 if both of the step S504 and the step S506 are satisfied.

The controller 70 determines whether the current engine speed is faster than or equal to a predetermined minimum engine speed at step S512, and determines whether the current engine speed is slower than or equal to a predetermined maximum engine speed at step S514. After that, the controller 70 determines whether both of the step S512 and the step S514 are satisfied at step S516, and outputs the satisfaction signal of the engine speed condition at the step S412 if both of the step S512 and the step S514 are satisfied.

The controller 70 calculates a torque gradient by dividing a difference between a previous engine torque and a current engine torque by a detecting period at step S502, and filters the torque gradient. In addition, the controller 70 calculates a difference between the current engine torque and the minimum engine torque according to the engine speed at step S518, and calculates a maximum torque gradient by dividing the difference by a regeneration period (it is predetermined) at step S520. After that, the controller 70 determines whether the filtered torque gradient is smaller than the maximum torque gradient at step S522, and outputs the satisfaction signal of the torque gradient condition at the step S411 if the filtered torque gradient is smaller than the maximum torque gradient. The torque gradient condition is required to inhibit regeneration where the engine torque decreases near the minimum engine torque.

The controller 70 calculates a minimum gear stage by inputting the engine torque and the engine speed into a predetermined map 106, and determines whether a currently engaged gear stage is higher than or equal to the minimum gear stage at step S510. If the currently engaged gear stage is higher than or equal to the minimum gear stage, the controller 70 outputs the satisfaction signal of the gear stage condition at the step S415.

Hereinafter, referring to FIG. 7, the step S420 in FIG. 5 will be described in further detail.

Figure 7:
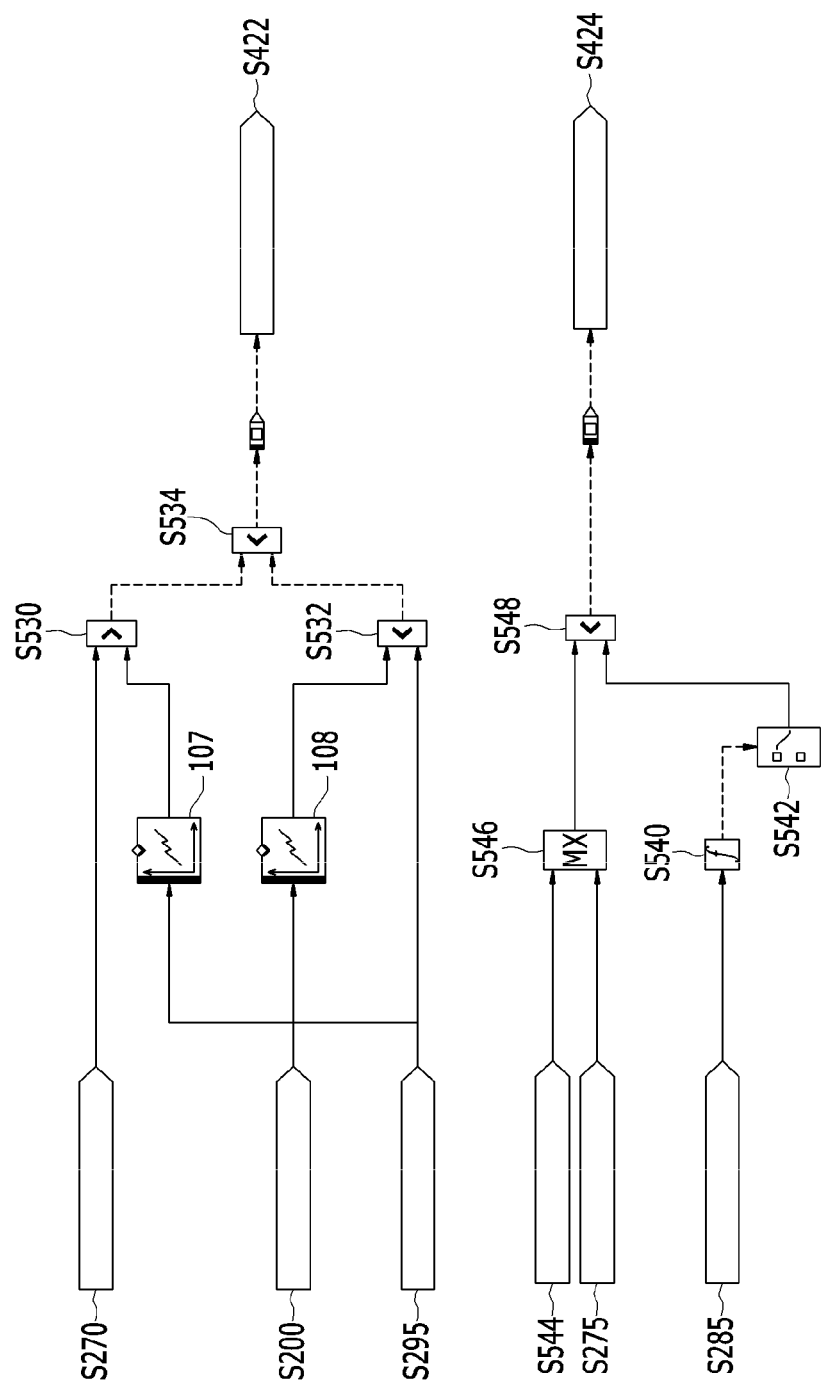
FIG. 7 illustrates step S420 in FIG. 5 in further detail.

As shown in FIG. 7, the controller 70 calculates a minimum temperature at the upstream of the LNT 40 by inputting the average temperature of the LNT 40 into a predetermined map 107, and determines whether the temperature at the upstream of the LNT 40 is higher than or equal to the minimum temperature at the upstream of the LNT 40 at step S530. In addition, the controller 70 calculates a minimum regeneration temperature of the LNT 40 by inputting the mass flow of the exhaust gas passing through the LNT 40 into a predetermined map 108, and determines whether the average temperature of the LNT 40 is higher than the minimum regeneration temperature of the LNT 40 at step S532. After that, the controller 70 determines whether both of the step S530 and the step S532 are satisfied at step S534, and outputs the satisfaction signal of a temperature condition at the upstream of the LNT at step S422 if both of the step 530 and the step S532 are satisfied.

The controller selects a maximum value of a last slice temperature of the LNT 40 and the temperature at the downstream of the LNT 40 at step S546, determines whether the engine operation mode is the regeneration mode at step S540, and calculates a maximum regeneration temperature of the LNT 40 according to the engine operation mode at step S542.

Herein, the controller 70 separates and identifies the LNT 40 as n slices. That is, the LNT 40 is divided into n slices from a first slice to n-th slice. The n slices are sequentially disposed along a flow of the exhaust gas and are physically or virtually separated. In addition, the controller 70 calculates a first slice temperature from the temperature at the upstream of the LNT 40 and heat that is generated at or removed from the first slice, and calculates a second slice temperature from the first slice temperature and heat that is generated at or removed from the second slice. In the same way, the controller 70 calculates n-th slice temperature and identifies the n-th slice temperature as the last slice temperature. On the contrary, the controller 70 defines the temperature at the downstream of the LNT 40 as the last slice temperature of the LNT 40.

In addition, the maximum regeneration temperature of the LNT 40 according to the engine operation mode may be predetermined. For example, the maximum regeneration temperature of the LNT 40 may be set to 580° C. at the regeneration mode and may be set to 500° C. at a mode that is not the regeneration mode. The maximum regeneration temperature of the LNT 40 according to the engine operation mode may not be limited to the examples described herein and may be suitably set according to performance of the LNT 40 by a person of an ordinary skill in the art.

If the maximum value of the last slice temperature and the temperature at the downstream of the LNT 40 and the maximum regeneration temperature of the LNT 40 according to the engine operation mode are calculated, the controller 70 determines whether the maximum value is lower than maximum regeneration temperature of the LNT 40 at step S548. If the maximum value is lower than the maximum regeneration temperature of the LNT 40, a satisfaction signal of a temperature condition at the downstream of the LNT is output at step S424.

Hereinafter, referring to FIG. 8, the step S430 in FIG. 5 will be described in further detail.

Figure 8:
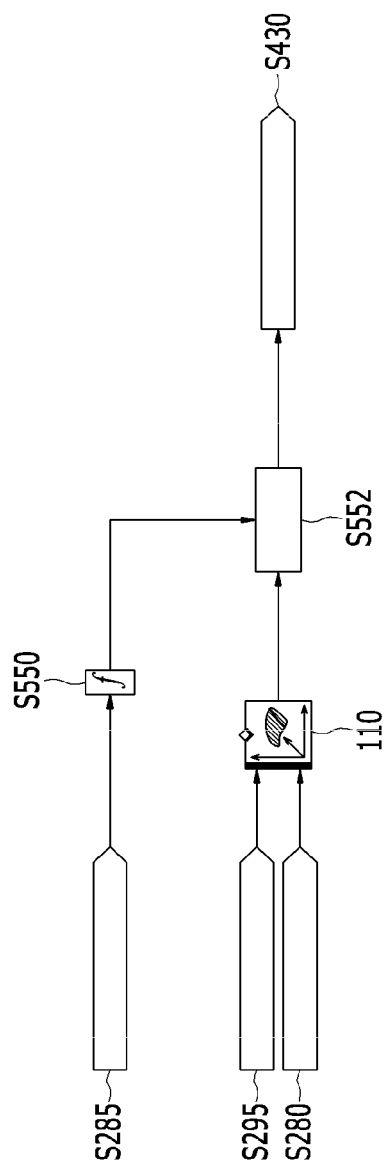
FIG. 8 illustrates step S430 in FIG. 5 in further detail.

As shown in FIG. 8, the controller 70 determines whether the engine operation mode is the regeneration mode at step S550, and activates step S552 if the engine operation mode is not the regeneration mode. In addition, the controller 70 calculates a minimum time between regenerations by inputting the average temperature of the LNT 40 and the NOx adsorption ratio of the LNT 40 into a predetermined map 110. At the step S552, the controller 70 compares an activated time for which the step S552 is activated with the minimum time between regenerations, and outputs the satisfaction signal of the minimum time condition between regenerations at the step S430 if the activated time is larger than the minimum time between regenerations.

Hereinafter, referring to FIG. 9, the step S440 in FIG. 5 will be described in further detail.

Figure 9:
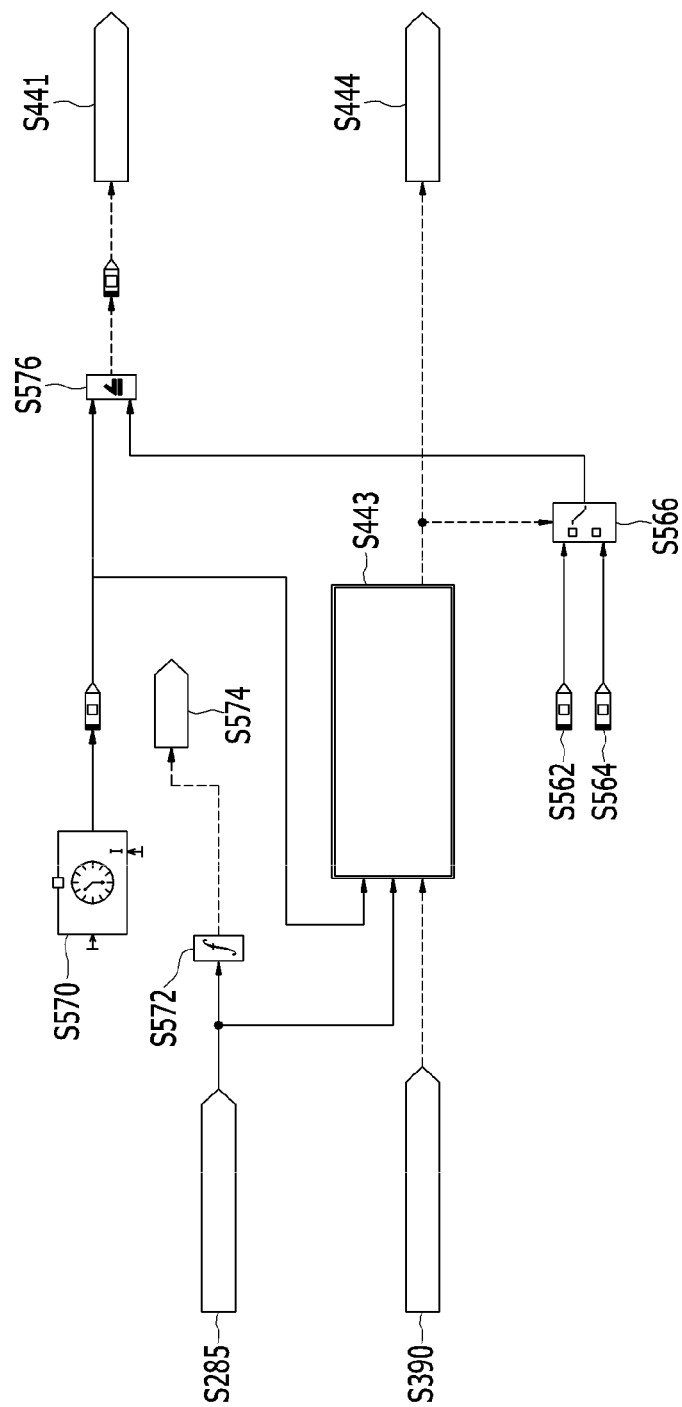
FIG. 9 illustrates step S440 in FIG. 5 in further detail.

As shown in FIG. 9, if the regeneration mode is begun, the controller 70 turns on a timer and counts a time for which the regeneration mode proceeds at step S570. In addition, the controller 70 determines whether the lambda sensor synchronization demand switch is turned on and calculates the number of consecutive events where lambda sensor synchronization fails at step S443 based on the engine operation mode, whether the lambda sensor synchronization occurs, and the time for which the regeneration mode proceeds. If the lambda sensor synchronization occurs or the time for which the regeneration mode proceeds is larger than or equal to a predetermined time, the controller 70 outputs a signal for turning on the synchronization demand switch at step S444. In addition, if the number of consecutive events where the lambda sensor synchronization fails is greater than or equal to the predetermined number and the time for which the regeneration mode proceeds is larger than or equal to a predetermined time, the controller 70 turns on the synchronization demand switch and changes a maximum predetermined time at step S566. That is, at the step S566, a first maximum predetermined time and a second maximum predetermined time are input at steps S562 and S564. The first maximum predetermined time represents a time interval from beginning of regeneration of the LNT 40 to a time when purification efficiency does not increase, and is predetermined. In addition, the second maximum predetermined time is a time interval to a time when purification efficiency abruptly decreases. That is, the first maximum predetermined time is a maximum predetermined time that is used when the number of consecutive events where the lambda sensor synchronization fails is smaller than the predetermined number, and the second maximum predetermined time is a maximum predetermined time that is used when the number of consecutive events where the lambda sensor synchronization fails is greater than or equal to the predetermined number. Therefore, if the number of consecutive events where the lambda sensor synchronization fails is greater than or equal to the predetermined number, the controller 70 performs the regeneration for the second maximum predetermined time. Herein, an increased regeneration number of times that the regeneration is performed for the second maximum predetermined time may be predetermined. That is, the controller 70 performs the regeneration for the second maximum predetermined time the increased regeneration number of times, and then resets the number of consecutive events where the lambda sensor synchronization fails.

As described above, if the maximum predetermined time is determined, the controller 70 determines whether a period for which the regeneration mode proceeds is larger than or equal to the maximum predetermined time at step S576, and outputs the satisfaction signal of the maximum regeneration period condition at step S441 if the period for which the regeneration mode proceeds is larger than or equal to the maximum predetermined time.

Meanwhile, the controller 70 determines whether the engine operation mode is not the regeneration mode at step S572, and outputs a reset signal at step S574 if the engine operation mode is not the regeneration mode.

Hereinafter, referring to FIG. 10, the step S443 in FIG. 9 will be described in further detail.

Figure 10:
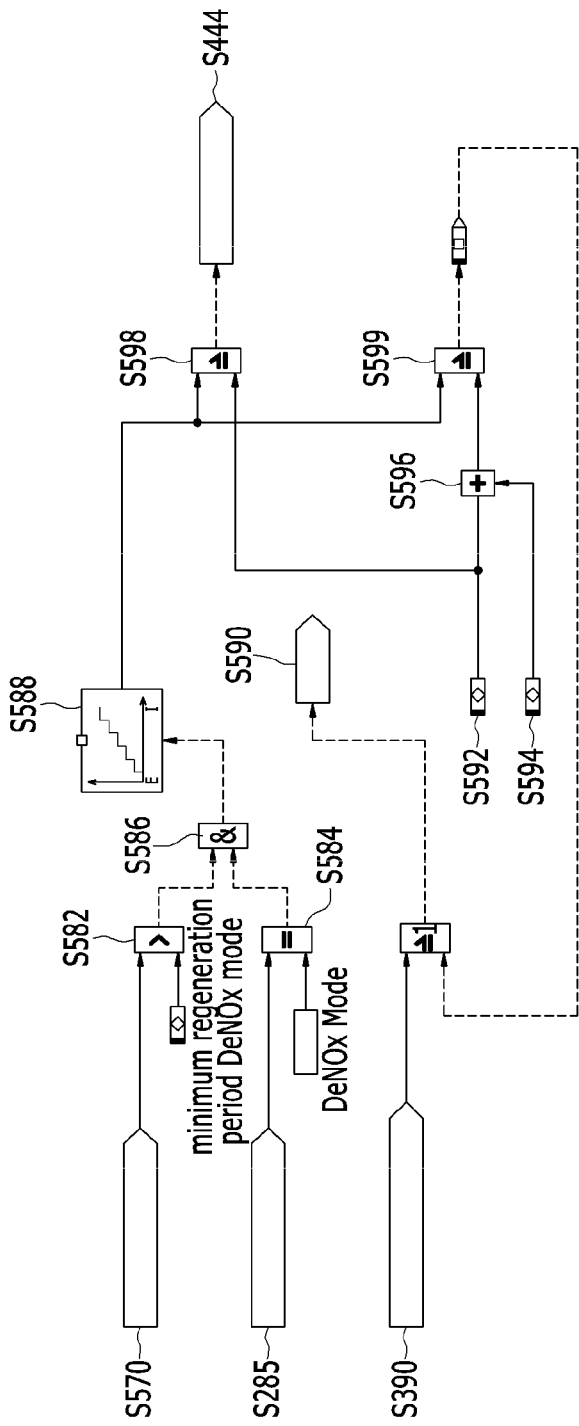
FIG. 10 illustrates step S443 in FIG. 9 in further detail.

As shown in FIG. 10, the controller 70 determines whether the period for which the regeneration mode proceeds is larger than a predetermined minimum regeneration period at step S582, and determines whether the engine operation mode is the regeneration mode at step S584. After that, the controller 70 determines whether both of the step S582 and the step S584 are satisfied at step S586, and counts the number of consecutive events where the lambda sensor synchronization fails at step S588 if both of the step S582 and the step S584 are satisfied and the lambda sensor synchronization does not occur.

In addition, the controller 70 receives or reads the predetermined number as step S592, and determines whether the number of consecutive events where the lambda sensor synchronization fails is greater than or equal to the predetermined number at step S598. If the number of consecutive events where the lambda sensor synchronization fails is greater than or equal to the predetermined number, the controller 70 outputs a signal for turning on the synchronization demand switch at the step S444.

In addition, the controller 70 receives or reads a regeneration number of times that the regeneration is performed at step S594, and adds up the predetermined number and the regeneration number of times at step S596. After that, the controller 70 determines whether the number of consecutive events where the lambda sensor synchronization fails is greater than or equal to a sum of the predetermined number and the regeneration number of times at step S599. After that, if the number of consecutive events where the lambda sensor synchronization fails is greater than or equal to the sum of the predetermined number and the regeneration number of times and the lambda sensors are synchronized, the controller 70 outputs a reset signal at step S590. If the reset signal is output at the step S590, the controller 70 may reset the number of consecutive events where the lambda sensor synchronization fails.

Hereinafter, referring to FIG. 11, the step S450 in FIG. 5 will be described in further detail.

Figure 11:
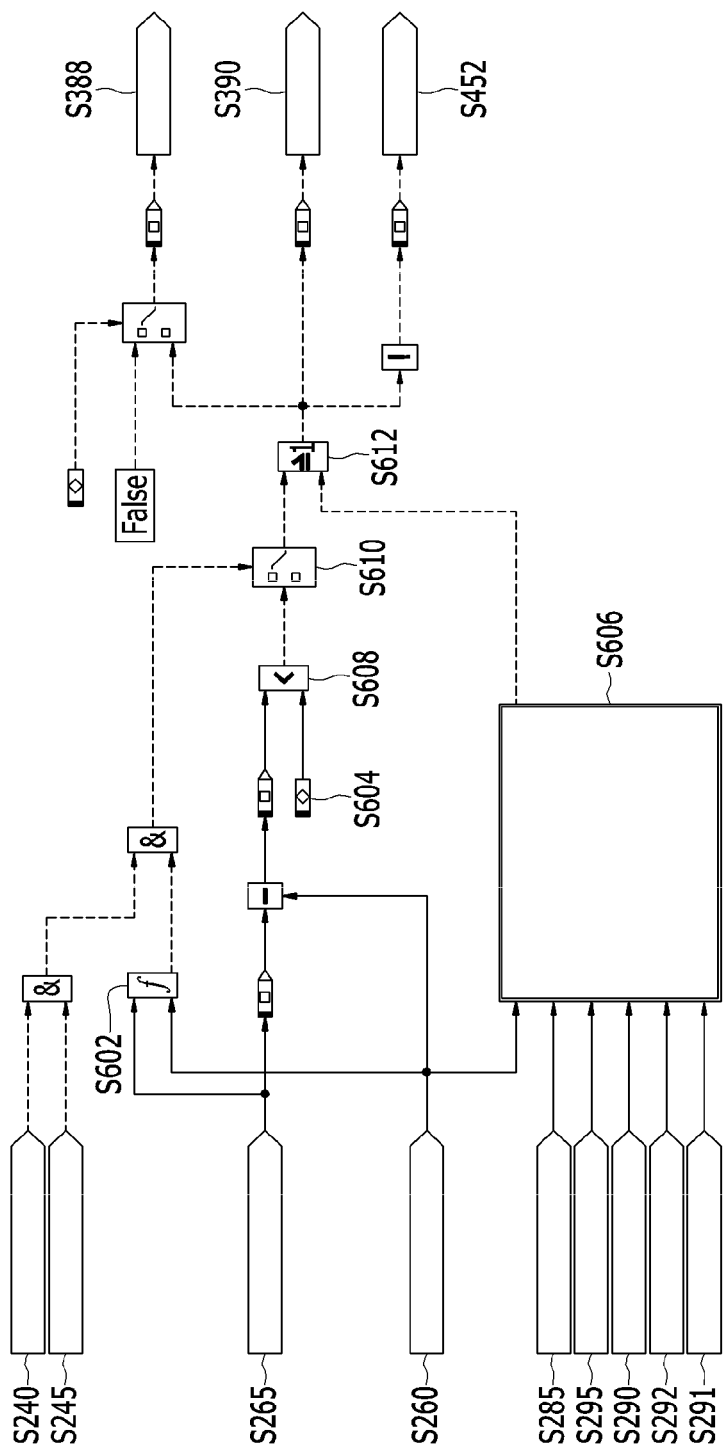
FIG. 11 illustrates step S450 in FIG. 5 in further detail.

As shown in FIG. 11, the controller 70 detects whether the first oxygen sensor 72 and the second oxygen sensor are activated, and determines whether both of the upstream lambda and the downstream lambda are smaller than 1 at step S602 if the first oxygen sensor 72 and the second oxygen sensor are activated. In addition, the controller 70 receives or reads a predetermined offset at step S604, and determines whether a difference between the downstream lambda and the upstream lambda is smaller than the offset at step S608. After that, if the first oxygen sensor 72 and the second oxygen sensor are activated, both of the upstream lambda and the downstream lambda are smaller than 1, and the difference between the downstream lambda and the upstream lambda is smaller than the offset, the controller 70 determines that the lambda sensor synchronization occurs at step S610.

In addition, the controller 70 determines whether the NH3 is generated at the LNT 40 at step S606 based on the upstream lambda, the engine operation mode, the average temperature of the LNT 40, the NOx adsorption in the LNT 40, the NOx concentration at the upstream of the LNT 40, and the NOx concentration at the downstream of the LNT 40. In further detail, the controller 70 calculates a rich progress rate when the engine operation mode is the regeneration mode based on the upstream lambda, the average temperature of the LNT 40, the NOx adsorption in the LNT 40, the NOx concentration at the upstream of the LNT 40, and the NOx concentration at the downstream of the LNT 40. The controller 70 determines that the NH3 is generated at the LNT 40 if the rich progress rate is greater than or equal to a predetermined rich progress rate. On the contrary, the controller 70 may determine that the NH3 is generated at the LNT 40 if the period for which the regeneration mode proceeds is larger than or equal to a predetermined NH3 generation time.

After that, the controller 70 determines whether the step S610 or the step S606 is satisfied at step S612. If the step S612 is satisfied, the controller 70 outputs the lambda sensor synchronization signal at the step S390. Simultaneously, the controller 70 outputs the satisfaction signal of the lambda sensor synchronization condition at the step S452 and outputs the reset signal of NOx and O2 adsorption due to lambda sensor synchronization at the step S388.

While this present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

What is claimed is:

1. A method of regenerating a lean NOx trap (LNT) of an exhaust purification system of a vehicle provided with the LNT and a selective catalytic reduction (SCR) catalyst, comprising:
    determining, by a control unit, whether a regeneration release condition of the LNT is satisfied based on signals from various sensors;
    determining, by the control unit, whether a regeneration demand condition of the LNT is satisfied based on signals from the various sensors; and
    performing, by the control unit, regeneration of the LNT when the regeneration release condition of the LNT and the regeneration demand condition of the LNT are satisfied,
    wherein the regeneration release condition of the LNT is satisfied when all of an engine operating condition, an LNT state condition, and a lambda sensor synchronization condition are satisfied, and
    wherein the engine operating condition is satisfied when an engine torque is between a minimum engine torque and a maximum engine torque according to an engine speed, the engine speed is between a minimum engine speed and a maximum engine speed, a gear stage is higher than or equal to a minimum gear stage according to the engine speed and the engine torque, and a torque gradient is smaller than a maximum torque gradient according to the minimum engine torque.

2. The method of claim 1, wherein the maximum torque gradient is calculated by dividing a difference between the minimum engine torque and a current engine torque by a predetermined regeneration period.

3. The method of claim 1, wherein the LNT state condition is satisfied when all of an LNT temperature condition, a minimum time condition between regenerations, and a maximum regeneration period condition are satisfied.

4. The method of claim 3, wherein the LNT temperature condition is satisfied when an upstream temperature of the LNT is higher than a minimum upstream temperature of the LNT according to an average temperature of the LNT, the average temperature of the LNT is higher than a minimum regeneration temperature of the LNT according to a mass flow of an exhaust gas passing through the LNT, and a downstream temperature of the LNT is lower than a maximum regeneration temperature of the LNT.

5. The method of claim 4, wherein the maximum regeneration temperature of the LNT is preset according to an engine operation mode.

6. The method of claim 3, wherein the minimum time condition between regenerations is satisfied when a time passes from previous regeneration is larger than a minimum time between regenerations according to an average temperature of the LNT and a NOx adsorption ratio of the LNT.

7. The method of claim 3, wherein the maximum regeneration period condition is satisfied when a time passes from beginning of regeneration is larger than or equal to a maximum predetermined time.

8. The method of claim 7, wherein the maximum predetermined time is changeable according to a number of consecutive events where lambda sensor synchronization fails.

9. The method of claim 1, wherein the various sensors include first and second oxygen sensors, and the lambda sensor synchronization condition is satisfied when a difference between detected values by the first and second oxygen sensors that are mounted respectively at an upstream and a downstream of the LNT is smaller than a predetermined value or ammonia (NH3) is generated at the LNT.

10. An exhaust purification system for an engine including an injector configured to inject fuel thereinto, the engine generating power by burning a mixture of air and the fuel, the engine exhausting an exhaust gas generated in a combustion process to an exterior thereof through an exhaust pipe, the exhaust purification system comprising:
    a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using a reductant including carbon or hydrogen contained in the exhaust gas;
    a dosing module mounted at the exhaust pipe downstream of the LNT and configured to directly inject a reducing agent into the exhaust gas;
    a selective catalytic reduction (SCR) catalyst mounted at the exhaust pipe downstream of the dosing module and configured to reduce the NOx contained in the exhaust gas by using the reducing agent injected by the dosing module; and
    a controller configured to perform denitrification (DeNOx) by using the LNT and/or the SCR catalyst according to a driving condition of the engine,
    wherein the controller is configured to perform regeneration of the LNT when both of a regeneration demand condition of the LNT and a regeneration release condition of the LNT are satisfied, and
    wherein the regeneration release condition of the LNT is satisfied when all of an engine operating condition, an LNT state condition, and a lambda sensor synchronization condition are satisfied,
    wherein the engine operating condition is satisfied when an engine torque is between a minimum engine torque and a maximum engine torque according to an engine speed, the engine speed is between a minimum engine speed and a maximum engine speed, a gear stage is higher than or equal to a minimum gear stage according to the engine speed and the engine torque, and a torque gradient is smaller than a maximum torque gradient according to the minimum engine torque.

11. The exhaust purification system of claim 10, wherein the controller is configured to calculate the maximum torque gradient by dividing a difference between the minimum engine torque and a current engine torque by a predetermined regeneration period.

12. The exhaust purification system of claim 10, wherein the LNT state condition is satisfied when all of an LNT temperature condition, a minimum time condition between regenerations, and a maximum regeneration period condition are satisfied.

13. The exhaust purification system of claim 12, wherein the LNT temperature condition is satisfied when an upstream temperature of the LNT is higher than a minimum upstream temperature of the LNT according to an average temperature of the LNT, the average temperature of the LNT is higher than a minimum regeneration temperature of the LNT according to a mass flow of an exhaust gas passing through the LNT, and a downstream temperature of the LNT is lower than a maximum regeneration temperature of the LNT.

14. The exhaust purification system of claim 13, wherein the maximum regeneration temperature of the LNT is preset according to an engine operation mode.

15. The exhaust purification system of claim 12, wherein the minimum time condition between regenerations is satisfied when a time passes from previous regeneration is larger than a minimum time between regenerations according to an average temperature of the LNT and a NOx adsorption ratio of the LNT.

16. The exhaust purification system of claim 12, wherein the maximum regeneration period condition is satisfied when a time passes from beginning of regeneration is larger than or equal to a maximum predetermined time.

17. The exhaust purification system of claim 16, wherein the maximum predetermined time is changeable according to a number of consecutive events where lambda sensor synchronization fails.

18. The exhaust purification system of claim 10, wherein the lambda sensor synchronization condition is satisfied when a difference between detected values by first and second oxygen sensors that are mounted respectively at an upstream and a downstream of the LNT is smaller than a predetermined value or ammonia ($NH_3$) is generated at the LNT.

* * * * *